June 10, 1924.
L. W. CHUBB
1,497,430
ELECTROLYTIC CONDENSER
Filed Dec. 30, 1919
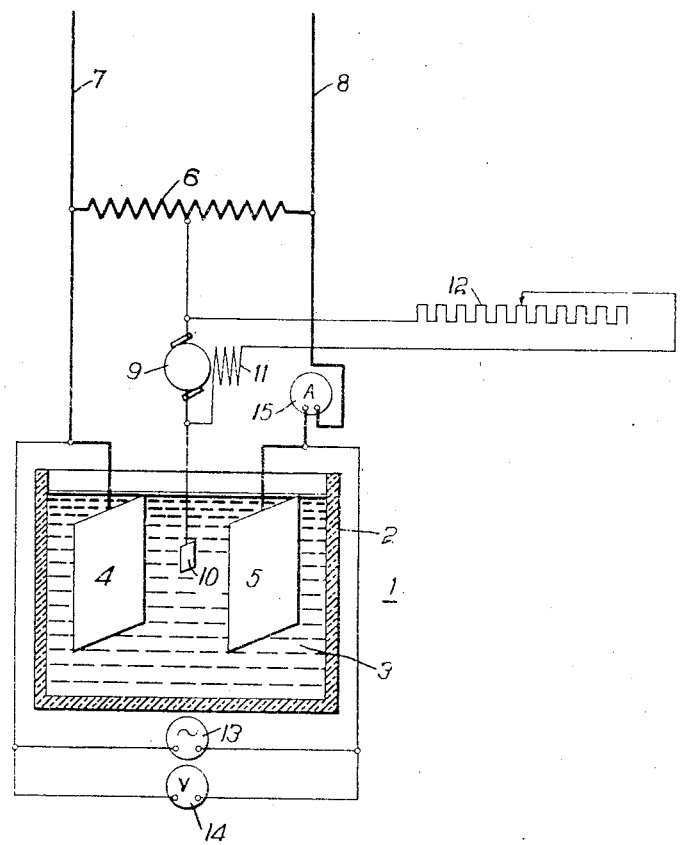
WITNESSES:
INVENTOR
Lewis Warrington Chubb
BY
ATTORNEY Patented June 10, 1924.

1,497,430

UNITED STATES PATENT OFFICE.

LEWIS W. CHUBB, OF EDGEWOOD, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER.

Application filed December 30, 1919. Serial No. 348,440.

*To all whom it may concern:*

Be it known that I, LEWIS W. CHUBB, a citizen of the United States, and a resident of Edgewood, in the county of Allegheny and State of Pennsylvania, have invented a new and useful Improvement in Electrolytic Condensers, of which the following is a specification.

My invention relates to electrolytic condensers and, more particularly, to condensers of the type formed by employing a plurality of film-forming electrodes immersed in a suitable electrolyte, and it has, for its primary object, the provision of condensers of the above designated type which shall be particularly suitable to be employed in tuned or resonant circuits of variable voltage and variable frequency.

I have found that the capacitance, the power factor and the life of a condenser are dependent upon operating conditions and are especially affected by changes in the voltage impressed upon the electrodes, which result in a variable film stress. A condenser provided with a constant direct-current excitation, when operated at a variable voltage, has a capacitance change that varies with the impressed voltage. The power factor of such a condenser settles down to a low value after being subjected to a constant voltage for some time, but, with a change in voltage, the power factor changes suddenly at first and then settles down to a new value.

It has also been found that the rise of power factor which is experienced in this type of condenser usually results in a deterioration of the plates or electrodes and that the maintenance of a low value of power factor, by a suitable adjustment of the direct-current excitation, will prevent this deterioration of the electrodes.

One object of my invention, therefore, resides in the provision of an electroyltic condenser which shall be particularly suitable for variable-voltage and variable-frequency circuits and which shall be adapted to operate with a substantially constant capacitance and a low, and substantially steady value of power factor.

With these and other objects in view, my invention will be more fully described and illustrated in the drawing, which is a diagram of an electrolytic condenser and additional electrical equipment by means of which the power factor may be determined and the value of direct-current excitation adjusted accordingly.

I have found that the change in power factor and in capacitance resulting from a variation in the impressed voltage on a condenser is a delayed function and may be corrected, either manually or automatically, by suitably varying the direct-current excitation to maintain the condenser under the desired operating conditions. Various structures may be employed to accomplish the purpose of my invention, but, in order to illustrate and insure a clear understanding thereof, I have shown a particular structure in which the adjustment of the direct-current excitation is manually effected.

In the single figure of the drawing, is shown a condenser 1 comprising a suitable tank 2 containing an electrolyte 3 in which a plurality of film-forming electrodes 4 and 5 are immersed. The electrodes 4 and 5 are connected to a balance coil 6 or the secondary winding of a transformer which may be connected to alternating-current mains by conductors 7 and 8. The potential of the electrolyte 3 is depressed by a direct-current exciting means 9 which is connected between the mid-point of the balance coil 6 and an auxiliary electrode 10 immersed in the electrolyte 3.

As here shown, the exciting means 9 comprises a direct-current generator having a shunt field 11 which is connected to the terminals of the generator 9 and in series with a variable-length resistor 12. A frequency meter 13 and a voltmeter 14 are connected in parallel relation to the condenser 1, and an ammeter 15 is connected in series therewith. By means of the three instruments, the capacitance of the condenser may readily be determined at any time, and, if a change from the normal value is indicated, the excitation of the generator 9 may be readily changed by varying the value of resistance in the field circuit 11, by adjusting the variable resistor 12 in the desired direction.

I have found that, when the capacitance of the condenser is decreased, it is usually occasioned by too great a film stress on the electrodes 4 and 5. When the capacitance is decreased, therefore, the excitation of the generator 9 is decreased by increasing the active length of the variable resistor 12 and, when the capacitance of the condenser increases, the excitation of the generator is increased by adjustment of the variable resistor in the opposite direction.

Although I have shown and described an electrolytic condenser connected to a direct-current generator in order to obtain direct-current excitation for the condenser, it is obvious that any means of direct-current excitation that will depress the potential of the electrolyte below the potential of the electrodes may be employed, and I desire, therefore, that no limitations shall be imposed upon my invention, except such as are indicated in the appended claims.

I claim as my invention:—

1. The combination with an electrolytic condenser comprising a plurality of electrodes immersed in a suitable electrolyte, of means for connecting the condenser to an alternating-current supply circuit, means for providing direct-current excitation therefor, means for indicating a change in the capacitance of the condenser and means for compensating for such a change to maintain the capacitance of the condenser substantially constant.

2. The combination with an electrolytic condenser comprising a plurality of electrodes immersed in a suitable electrolyte, of means for connecting the condenser to an alternating-current supply circuit, means for indicating a change in the capacitance of the condenser, said means including a frequency meter, and means for compensating for a change in the capacitance of the condenser to maintain its capacitance substantially constant.

3. The combination with an electrolytic condenser comprising a plurality of film-forming electrodes and an auxiliary electrode immersed in a suitable electrolyte, of means for connecting the condenser to an alternating-current supply circuit, means for supplying a direct current to the condenser through the auxiliary electrode, means for indicating a change in the capacitance of the condenser, and means for compensating for such a change in the capacitance, said means including means for varying the value of the direct current supplied to the condenser.

In testimony whereof, I have hereunto subscribed my name this 29th day of December 1919.

LEWIS W. CHUBB.